US006886786B1

(12) United States Patent
Huynh

(10) Patent No.: US 6,886,786 B1
(45) Date of Patent: May 3, 2005

(54) ENGINE THRUST MANAGEMENT—NEW DESIGN ARCHITECTURE

(75) Inventor: Kiet T. Huynh, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 10/684,172

(22) Filed: Oct. 10, 2003

(51) Int. Cl.$^7$ ............................................ G05D 1/08
(52) U.S. Cl. ..................... 244/182; 244/175; 244/188; 701/8; 701/110
(58) Field of Search ........................... 244/182, 76 R, 244/175, 188; 701/8, 110

(56) References Cited

U.S. PATENT DOCUMENTS

| | | | | |
|---|---|---|---|---|
| 3,691,356 A | * | 9/1972 | Miller | 701/15 |
| 4,641,268 A | * | 2/1987 | Zweifel et al. | 701/121 |
| 5,050,081 A | | 9/1991 | Abbott et al. | |
| 5,277,024 A | * | 1/1994 | Bissey et al. | 60/39.281 |
| 5,299,765 A | * | 4/1994 | Blechen | 244/182 |
| 5,833,177 A | * | 11/1998 | Gast | 244/195 |
| 6,062,513 A | * | 5/2000 | Lambregts | 244/175 |
| 6,450,456 B1 | * | 9/2002 | Greene | 244/186 |
| 6,480,764 B2 | * | 11/2002 | Blondel et al. | 701/3 |
| 6,487,490 B1 | * | 11/2002 | Kamath et al. | 701/100 |

\* cited by examiner

Primary Examiner—J. Woodrow Eldred
(74) Attorney, Agent, or Firm—Harness, Dickey & Pierce P.L.C.

(57) ABSTRACT

An engine thrust management system comprising an engine control device, an aircraft flight manual, a flight management device and a cockpit instrument device. The engine control device is operable to calculate a percent maximum available thrust parameter and a percent indicated thrust parameter. The aircraft flight manual is operable to calculate a required thrust parameter. The flight management device is operable to calculate a percent thrust setting target parameter and a percent commanded thrust parameter. The percent commanded thrust is the amount of thrust requested by an aircraft operator. The percent commanded thrust is varied by the operator according to the value of the percent thrust setting target parameter and the value of the percent indicated thrust parameter in order to produce optimal thrust. The engine thrust management system promotes operating efficiency by eliminating redundant processes found in conventional thrust management systems and is applicable to a wide variety of engines and aircraft, thus promoting common cockpit display architecture.

25 Claims, 3 Drawing Sheets

ENGINE THRUST MANAGEMENT— NEW DESIGN ARCHITECTURE

FIELD OF THE INVENTION

The present invention generally relates to aircraft control systems. In particular, the present invention relates to a design architecture for aircraft engine thrust management.

BACKGROUND OF THE INVENTION

Conventional aircraft engine thrust management involves the use of several design processes, such as engine power management in an engine electronic control, thrust limit computer and flight management computer functions of an aircraft information management system, and an aircraft flight manual used for providing aircraft dispatch information. Although all of these processes are connected with three fundamental elements of engine thrust management (i.e. an engine thrust setting target, a commanded engine thrust, and a calculated engine produced thrust), the functional requirements of these processes are unique and do not constitute a system for thrust management on an aircraft.

Conventional engine thrust management is based on either the engine pressure ratio (EPR) or engine rotor speed (N1) parameters. Consequently, conversion back and forth between the three basic thrust elements and EPR or N1 is required. This results in unnecessary duplication and dependency of tasks implemented in each process. Further, implementation of a power management design for different engine types has to be incorporated repeatedly in all three processes. Cockpit display of the thrust setting indication is also different between different aircraft due to different engine types and/or different engine operating modes.

A conventional engine thrust management system is illustrated in FIG. 1 at 10. The conventional system 10 generally comprises an engine power management process 12, an engine electronic control 14 (EEC) located on aircraft engines (not shown), a flight management computer 16 located onboard an aircraft (not shown), and an electronic aircraft flight manual 18 (AFM), located remotely from the aircraft. The engine power management process 12 establishes the maximum rating power setting parameter (PSP) data, which is in terms of EPR or N1, at block 20 using two inputs. The first input, illustrated at block 22, comprises characteristics of the maximum available thrust (FN) and the PSP. The second input, illustrated at block 24, comprises the engine specification thrust or engine required thrust. The data developed at block 20 is duplicated in blocks 25, 29, and 35.

The engine electronic control 14 computes the maximum rated PSP at block 26. The maximum rated PSP pre-defined at block 20 is loaded into the engine electronic control 14 and is used for an engine fuel control parameter at block 28. Thus, by computing the maximum rated PSP at step 26, the EEC is performing a redundant operation with the engine power management process 12, which is a resource consuming process.

The FMC 16 also performs various redundant and resource consuming operations. Specifically, at block 30 the FMC 16 computes the maximum rated PSP, which is also performed at block 26 of the EEC 14. The target PSP at block 30 is also computed at block 36. At block 32 the FMC uses an EPM module to compute the available thrust (FN) and the power setting parameter (PSP), which requires the predetermined data at block 22. At block 34 the FMC computes thrust used in calculations of takeoff V-speeds and aircraft performance predictions, which is a reverse operation with process 12. Thus, the FMC 16 performs numerous redundant calculations, which are wasteful of computing resources and the process 12 must be completed prior to the development of the FMC 16.

The AFM 18 computes the required engine thrust at block 36. At block 38, the AFM 18 includes an EPM module that calculates the maximum available thrust FN and the power setting parameter PSP. Thus, block 38 performs the same operations as are performed at block 32 of the FMC 16 and also requires the pre-determined data block 22. At block 40 the AFM 18 computes the maximum rated PSP and the setting target PSP. Thus, the operations of blocks 26, 30, and 40 are redundant. At block 42, the AFM 18 computes thrust used in calculation of takeoff V-speeds, which is a reversed operation with process 12. The AFM 18 performs numerous redundant calculations, wasteful of computing resources and the process at block 12 must be completed prior to development of the AFM 18.

Thus, there is generally a need for an engine thrust management system that improves aircraft development flow time and aircraft performance capabilities. In particular, there is a need for an engine thrust management architecture that aligns the requirements and eliminates unnecessary redundant tasks across the three main components of engine thrust management. There is also a need for providing a common thrust setting indication that supports the common cockpit display concept.

SUMMARY OF THE INVENTION

The present invention provides for an aircraft engine thrust management system comprising an engine control device, an aircraft flight manual, a cockpit instrument device and a flight management device. The engine control device is operable to calculate a percent maximum available thrust parameter and a percent indicated thrust parameter. The aircraft flight manual is operable to calculate a required thrust parameter. The cockpit instrument device is operable to provide a percent commanded thrust parameter. The flight management device is operable to calculate a percent thrust setting target parameter. The percent commanded thrust is the amount of thrust requested by an aircraft operator. The percent commanded thrust is varied by the operator according to the value of the percent thrust setting target parameter and the value of the percent indicated thrust parameter in order to produce an optimal amount of thrust for a particular mission.

The present invention further provides for a method for managing aircraft engine thrust using percent thrust as the thrust indication parameter. The method comprises calculating a percent maximum available thrust parameter using an input from an aircraft sensor signal and an engine sensor signal, calculating a percent indicated thrust parameter using an engine produced thrust parameter, calculating a required thrust parameter using aircraft dispatch information, calculating a percent thrust setting target using the required thrust parameter, calculating a percent commanded thrust parameter using operator commands, and altering the percent commanded thrust parameter based upon changes in the percent thrust setting target to produce an optimal amount of thrust for a particular operation.

The invention still further comprises a method for controlling the thrust of an aircraft. The method comprises referencing a percent thrust setting target parameter representing the percent amount of thrust required to perform a specific operation and altering a percent commanded thrust parameter representing the percent amount of thrust requested to perform the specific operation so that the percent commanded thrust parameter at least substantially equals the percent thrust setting target. Using this method, an optimal engine thrust needed to perform a particular operation is produced in response to the altering step, the intensity of the engine thrust produced being represented by a percent indicated thrust parameter.

The invention further provides for a robust design process and system for engine thrust management without unnecessary duplication of functions. The process also accelerates design flow time and accommodates the common cockpit display concept.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
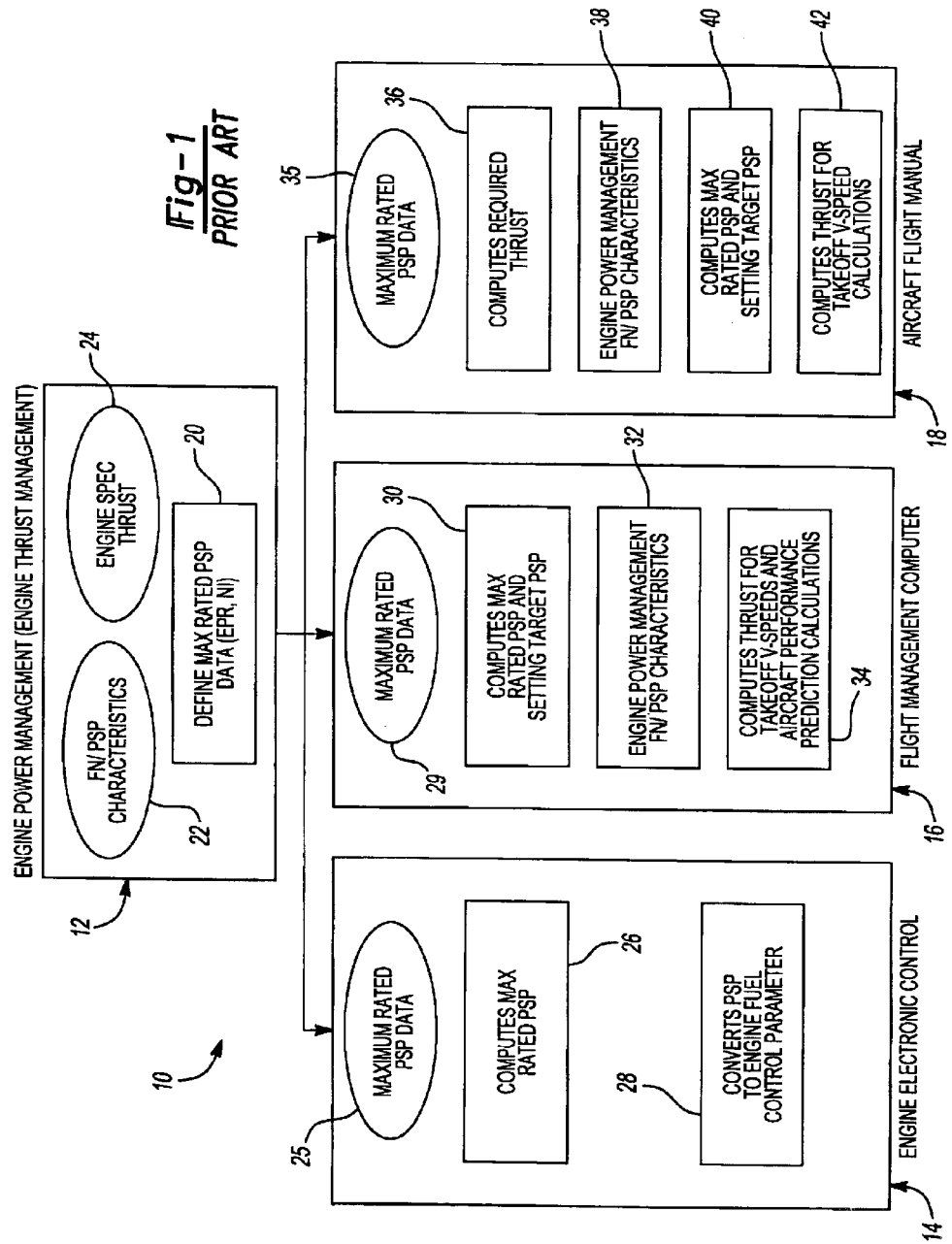
FIG. 1 is a block diagram illustrating the components of a conventional engine thrust management system and the general interaction between the components.
Figure 2:
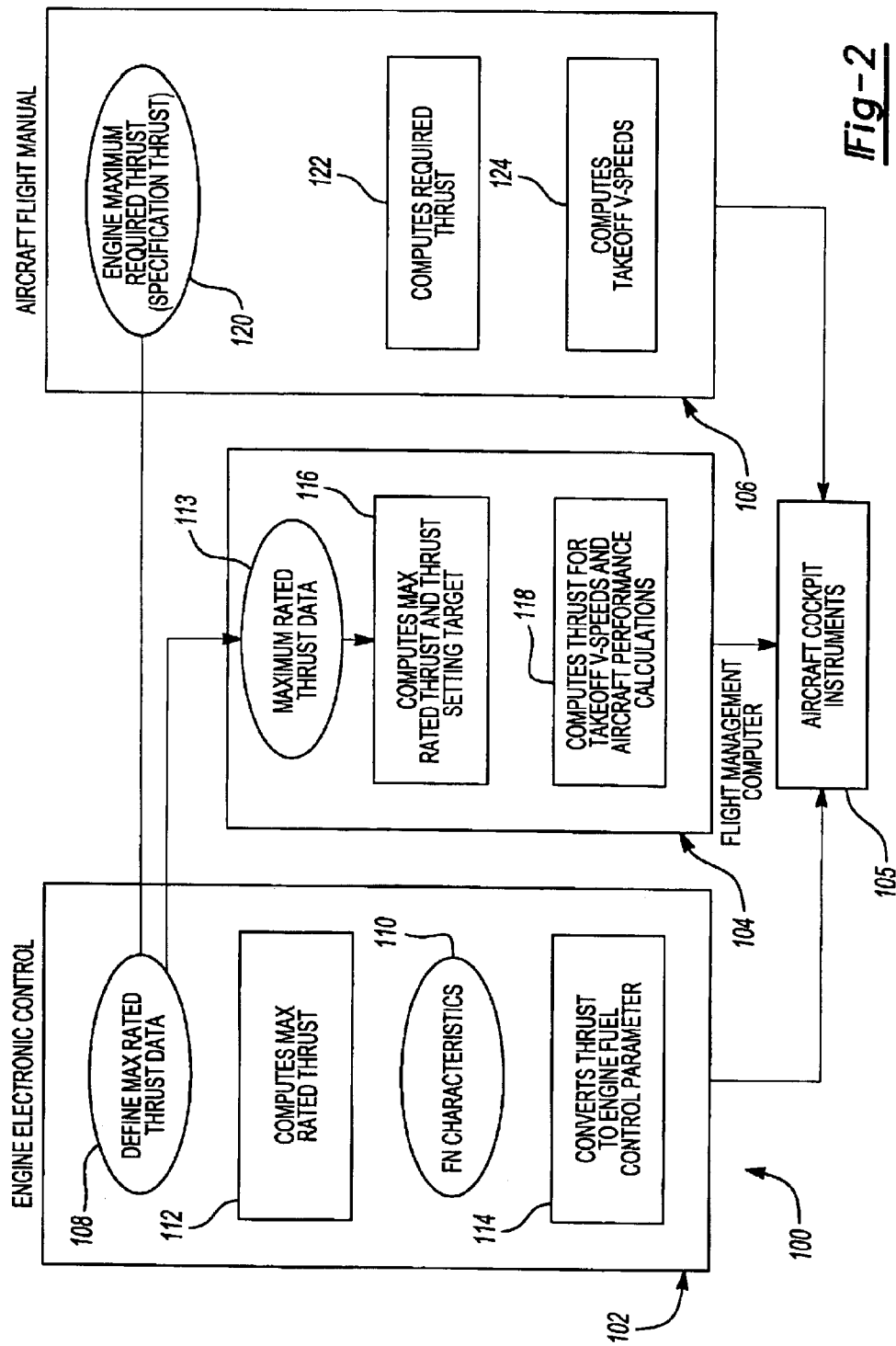
FIG. 2 is a block diagram illustrating the components of an engine thrust management system according the current invention and the general interaction between the components.

With initial reference to FIG. 2, an overview of the thrust management system of the present invention is generally illustrated at 100. The system 100 generally comprises an electronic engine control (EEC) 102 associated with an aircraft engine (not shown), a flight management computer (FMC) 104 typically located onboard an aircraft (not shown), aircraft instruments 105 and an aircraft flight manual (AFM) 106 typically located at a ground control station. The EEC 102 obtains the maximum rated thrust data at block 108 from block 120 of the aircraft flight manual 106. The EEC 102 includes a thrust characteristic at block 110 for converting the commanded thrust to an engine fuel control parameter at block 114. The EEC 102 and the FMC 104 compute the maximum rated thrust parameters at 112 and 116 respectively. The FMC 104 also computes a thrust setting target at block 116 for use in computing the maximum rated thrust parameter, also at block 116. The FMC 104 may simply download the maximum rated thrust data at 113 from the EEC 102 where this data is defined at block 108. Further, data computed at 116 is directly used for computing takeoff V-speeds and aircraft performance predictions at block 118. At block 122, the AFM 106 computes required thrust based on engine specification thrust 120 and the thrust computed at 122 is used directly in the calculations of block 124 where the AFM 106 computes takeoff V-speeds. Using percent thrust as a thrust indicating parameter, the EEC 102, FMC 104, and the AFM 106 do not perform duplicative operations.

Figure 3:
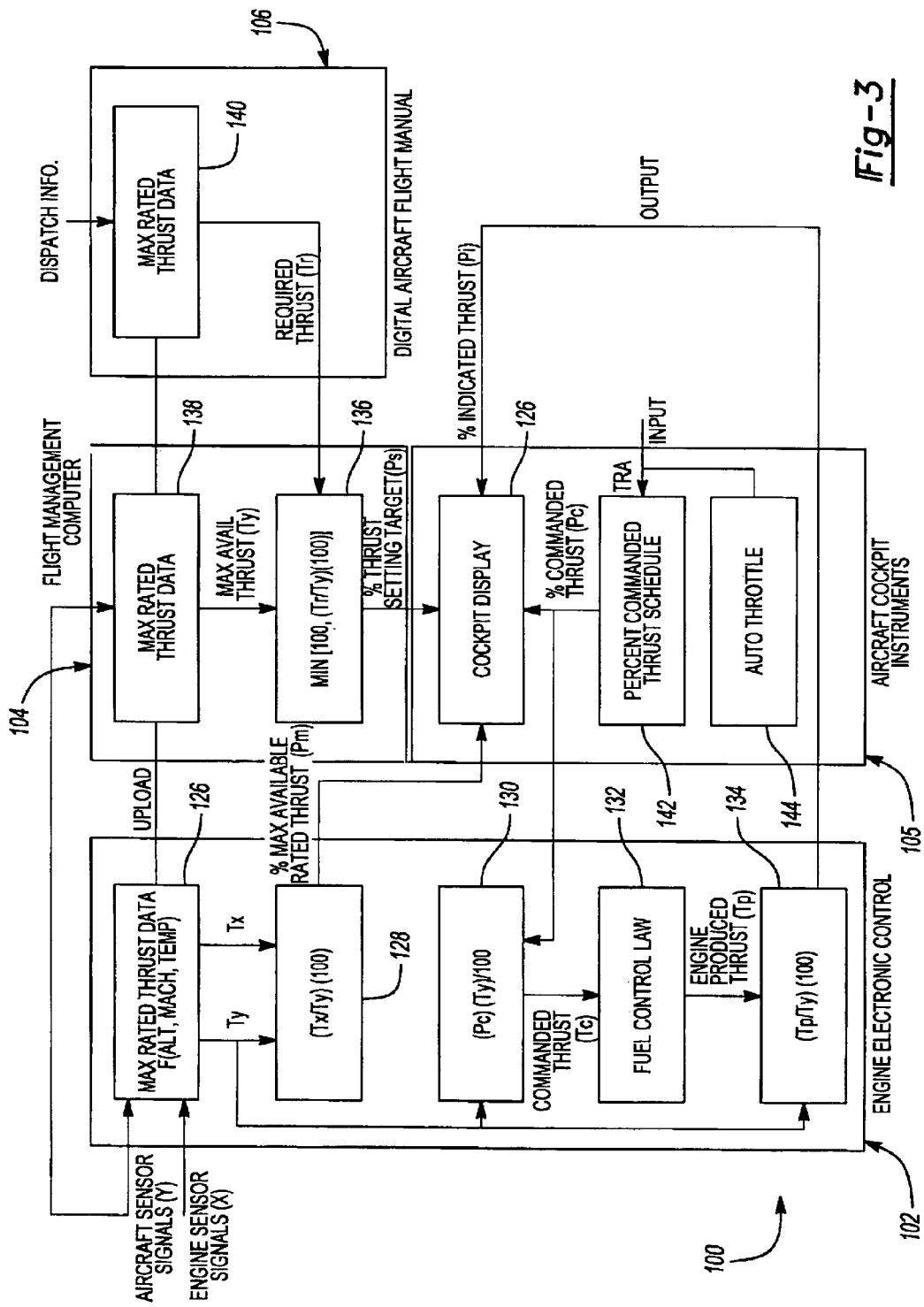
FIG. 3 is a block diagram providing a more detailed illustration of the components of the system of FIG. 2 and the operation of the components of FIG. 2, the system uses percent thrust as a thrust indicator parameter in an aircraft control loop.

FIG. 3 is a detailed diagram of the closed loop operation of the engine thrust management system 100. The thrust system 100 centers around the aircraft cockpit display 126, which is associated with aircraft instruments 105. The cockpit display 126 displays important parameters associated with the operation of the thrust management system 100. For example, the cockpit display 126 includes a percent maximum available thrust Pm (often referred to as a percent maximum available rated thrust), a percent thrust setting target Ps, a percent indicated thrust parameter Pi, and a percent commanded thrust Pc. Generation and use of these parameters displayed at the cockpit display 126 is described below.

As seen in FIG. 3, the EEC 102 receives sensor signals Y from the aircraft and sensor signals X from the engine. The sensor signals X and Y are redundant air data sources in some applications and may be various different parameters. The aircraft sensor signals are typically measurements of aircraft speed, altitude, and air temperature. The sensor signals X and Y are processed by the EEC 102 at block 126, which is encompassed by block 108 of FIG. 2, to calculate the maximum thrust available Tx in light of the engine conditions and the maximum thrust available Ty in light of the aircraft conditions. At block 128, which is encompassed by block 112 of FIG. 2, the maximum rated thrust Tx is divided by the maximum rated thrust Ty and the result is multiplied by 100 to determine the percent maximum available thrust Pm. Under normal conditions, and when the sensors are operating properly, Ty and Tx are equal and the percent maximum available thrust is 100%. If Ty and Tx are not equal, this alerts the operator that either the engine or the sensors are malfunctioning and further diagnostic testing is required.

At block 130 the system 100 calculates the commanded thrust Tc. Tc is calculated by multiplying the percent commanded thrust Pc by the maximum rated thrust Ty (as calculated by the aircraft sensor signals Y) and dividing the result by 100. The Tc is typically calculated in pounds, but may be calculated using any other suitable measurement system.

At block 132, which is encompassed by block 114 of FIG. 2, the engine fuel control system processes the target thrust Tc and provides the proper amount of fuel required to achieve the target thrust Tc. The amount of calculated thrust representing the engine thrust actually produced is Tp. While engine power is being accumulated to reach Tc, Tp does not initially equal the target thrust Tc.

At block 134, the actual thrust Tp is divided by the maximum rated thrust Ty, as determined using the aircraft sensor signals Y, and the result is multiplied by 100 to produce the percent indicated thrust Pi. The Pi indicates the amount of engine thrust produced as a percentage of the total available thrust. This parameter is the output of the control loop and is displayed to the operator via the cockpit display 126 of the aircraft instruments 105.

The percent thrust setting target Ps is also displayed to the operator via the cockpit display 126. Ps is calculated at block 136 of the flight management computer 104 using the maximum available thrust Ty and the required thrust Tr. The maximum available thrust data used in computing Ty may be uploaded from block 126 of the EEC 102 or may be calculated independently at block 138, which is encompassed by block 114 of FIG. 2.

The required thrust Tr is calculated by the AFM 106 at block 140. The AFM 18 receives aircraft dispatch information, typically from a ground station. The dispatch information includes any information related to the operation of the aircraft, such as, but not limited to, the payload weight, drag coefficient, runway length, altitude, ambient conditions, number of passengers, etc. While the AFM 106 typically receives most, if not all, of this dispatch information from the ground station, at least a portion of the dispatch information, such as the maximum rated thrust data, may also be uploaded from the EEC 102 and the FMC 104. The required thrust Tr is the amount of thrust that the aircraft needs to obtain a predetermined aircraft operational performance level. It is different for different aircraft missions. For example, the required thrust Tr for takeoff is greater than the required thrust Tr for cruising.

The percent thrust setting target Ps is specifically calculated at block 136 by dividing the required thrust Tr by the maximum available thrust Ty and multiplying the result by 100. The percent thrust setting target Ps is the amount of thrust needed to perform particular operations, such as take-off, climb, cruise, and landing. Since the limit of Tr is Ty, the value of Ps cannot exceed 100%. The percent thrust setting target Ps is displayed to the aircraft operator(s) at the cockpit display 126 of the instruments 105. Calculation of the percent thrust setting target Ps at block 136 is encompassed by block 116 of FIG. 2.

The operator inputs his/her thrust commands via a device, such as an engine throttle lever of aircraft instruments 105, which is in communication with the EEC 102 and the flight management computer 104, by manipulating the throttle resolve angle (TRA). Alternatively, thrust commands are generated by an auto throttle system at block 144. The percent commanded thrust Pc is calculated at block 142. Block 142 receives an input representing the degree to which the operator has manipulated the throttle to generate the percent commanded thrust parameter Pc that the operator requested to achieve the target Ps, which is displayed to the operator at the cockpit display 126.

Use of the thrust management system 100 using percent thrust as the thrust setting parameter to operate an aircraft will now be described. The operator first references the cockpit display 126 to make sure that the Pm is at 100%, indicating that the aircraft and engine systems are operating properly. The next parameter referenced is the percent thrust setting target Ps, which varies according to the particular phase of flight that the aircraft is in, such as take-off, cruise, descent, landing, etc. The operator then references the percent indicated thrust Pi to determine the thrust actually being produced by the engines at the particular moment in response to his/her commanded thrust Pc. If Pc and Ps are not equal, the operator manipulates the throttle resolve angle to request additional or reduced thrust as appropriate to vary the percent commanded thrust Pc. The operator continues to manipulate the throttle resolve angle as necessary to change the percent commanded thrust Pc until it equals the percent thrust setting target Ps. After the engine has an opportunity to respond to the operator's commands, the percent indicated thrust Pi will equal Pc as well as Ps. After parameters Ps, Pc, and Pi are equal, no further action is required by the operator because the engine is producing the proper amount of thrust for the particular operation at hand. As operating conditions change Ps will change, thus requiring the operator to again vary the Pc and repeat the above process to insure that the proper amount of thrust is provided.

Thus, the present invention provides for a system and method 100 for controlling the thrust of an aircraft engine using percent thrust as the thrust setting parameter. The system and method 100 generally includes an engine electronic control 102, a flight management computer 104, a cockpit instrument device 105 and a digital flight manual 106. The system and method 100 eliminates the inefficiencies and redundancies of conventional thrust management systems and the thrust logic of the system is contained in the engine electronic control 102, thus providing engine manufacturers with flexibility in designing their engine control. Specifically, the system and method 100 eliminates redundant engine power management modules of conventional flight management computers 16, and aircraft manuals 18 to convert a thrust setting target EPR or % N1 to a calculated thrust value. Further, the system and method 100 provides for engine control in terms of the percent thrust (% FN) parameter and eliminates the cumbersome use of the conventional thrust setting parameter N1 or EPR. Use of % FN is more efficient because it provides for a commonality in the thrust setting parameter (PSP) and thrust indication system that can be used throughout the different aircraft systems regardless of the engine application and eliminates the need to convert back and forth during operation of the system 100 between percent thrust values and PSP values. Still further, the present invention enhances the common cockpit display concept and the common thrust management architecture because the percent thrust setting parameter is used for the thrust setting indication system regardless of the airplane type, engine type, operating mode, etc. The system 100 further eliminates the need for calculation of the thrust setting target parameter in the AFM 106. The system 100 does not compromise any features of the existing airplane design, nor operational rules and certification regulations.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aircraft engine thrust management system comprising:

an engine control device operable to calculate a percent indicated thrust parameter representative of the amount of thrust being produced by an engine;

a flight dispatch information system operable to calculate a required thrust parameter representative of the amount of thrust required to carry out a particular flight operation;

a flight management computer for calculating a percent thrust setting target parameter representative of the percent amount of thrust required to carry out a particular flight operation; and a cockpit display for displaying the percent thrust setting target parameter, the percent indicated thrust parameter and a percent commanded thrust parameter representative of an amount of thrust requested to perform a particular flight operation;

wherein the percent commanded thrust is the amount of thrust requested by an aircraft operator to perform a particular flight operation; and wherein the percent commanded thrust is altered by the operator to approximately equal the percent thrust setting target parameter to produce optimal thrust for a particular flight operation.

2. The system of claim 1, wherein at least one of the percent maximum available thrust parameter, percent indicated thrust parameter, percent thrust setting target parameter, and percent commanded thrust parameter are displayed to the aircraft operator using a cockpit information display.

3. The system of claim 1, wherein said electronic engine control device receives aircraft sensor signals to calculate a maximum rated thrust.

4. The system of claim 1, wherein said electronic engine control device receives engine sensor signals to calculate a maximum rated thrust.

5. The system of claim 1, wherein said engine electronic control device receives the percent commanded thrust parameter and calculates a commanded thrust based upon, at least in part, the percent commanded thrust parameter.

6. The system of claim 5, wherein said engine electronic control device is operable to calculate an engine produced thrust parameter based upon, at least in part, the commanded thrust parameter.

7. The system of claim 6, wherein said engine electronic control device is operable to calculate the percent indicated thrust parameter based upon, in part the engine produced thrust parameter.

8. The system of claim 1, wherein said aircraft flight manual calculates the required thrust parameter using dispatch information.

9. The system of claim 8, wherein said dispatch information comprises at least one of the following parameters: aircraft payload weight, aircraft drag, runway length, altitude, and external ambient conditions.

10. The system of claim 1, wherein said flight management device calculates the percent thrust setting target using at least one of the required thrust parameter and a maximum available thrust parameter.

11. A method for managing aircraft engine thrust comprising:

calculating a percent indicated thrust parameter representative of a percentage amount of thrust currently being produced by an aircraft engine;

calculating a percent thrust setting target representative of a percent amount of thrust required to perform a particular flight operation;

calculating a percent commanded thrust parameter representative of a percent amount of thrust requested to perform a particular flight operation;

displaying the percent thrust setting target, the percent indicated thrust parameter, and the percent commanded thrust parameter on a cockpit display; and varying the percent commanded thrust parameter as required such that the percent indicated thrust parameter generally tracks the percent thrust setting target to produce an optimal amount of thrust for a particular operation.

12. The method of claim 1 further comprising:

calculating a first maximum rated thrust parameter based upon signals from an aircraft sensor signal; and calculating a second maximum rated thrust parameter based upon signals from an engine sensor signal.

13. The method of claim 11, wherein said altering step is continued until the percent commanded thrust parameter at least approximately equals the percent thrust setting target.

14. The method of claim 11, further comprising displaying at least one of the percent thrust setting target, the percent indicated thrust parameter, the percent commanded thrust parameter, and the percent maximum available thrust parameter on a cockpit display.

15. The method of claim 11, wherein said calculating the percent maximum available rated thrust parameter step is performed by an engine electronic control device and redundantly in a flight management computer for failure detection.

16. The method of claim 11, wherein said calculating the percent indicated thrust parameter step is performed by an engine electronic control device.

17. The method of claim 11, wherein said calculating the percent thrust setting target step is performed by a flight management computer.

18. The method of claim 11, wherein said calculating the required thrust parameter step is performed using an aircraft flight manual.

19. A method for controlling the thrust of an aircraft comprising:

referencing a percent thrust setting target parameter displayed on a cockpit display, the percent thrust setting target parameter representing the percent amount of thrust required to perform a specific flight operation; and varying a percent commanded thrust parameter displayed on the cockpit display, the percent commanded thrust parameter representing the percent amount of thrust requested to perform the specific flight operation, so that the percent commanded thrust parameter at least substantially approximates the percent thrust setting target;

wherein an engine produces optimal engine thrust to perform a particular operation in response to said varying step, the intensity of the engine thrust represented by a percent indicated thrust parameter which is displayed on the cockpit display.

20. The method of claim 19, wherein said altering step further comprises altering the percent commanded thrust parameter using a control device.

21. The method of claim 19, further comprising referencing a percent maximum available thrust parameter representing maximum rated thrust as determined by an aircraft sensor and an engine sensor to insure proper operation of the engine.

22. The method of claim 21, wherein the maximum available thrust parameter is calculated by an engine electronic control.

23. The method of claim 19, further comprising displaying the percent commanded thrust parameter, the percent thrust setting target, and the percent indicated thrust on a cockpit display instrument.

24. The method of claim 19, further comprising using a flight management computer to calculate the percent commanded thrust parameter and the percent thrust setting target.

25. The method of claim 19, further comprising calculating a required thrust parameter using an aircraft flight manual.

* * * * *